Patented Oct. 24, 1950

2,527,444

UNITED STATES PATENT OFFICE 2,527,444

PROCESSES FOR THE REMOVAL OF METHANE CONTENTS IN WATER

Carl Holger Visby Pape, Hellerup, near Copenhagen, Denmark, assignor to Olaf Andersen, Copenhagen, Denmark No Drawing. Application December 19, 1946, Serial No. 717,332. In Denmark October 29, 1941

3 Claims. (Cl. 210—26)

During late years investigations have proved that the appearance of methane in groundwater is very extensive.

The ordinarily known processes for decreasing or removing the content of gases in water by subjecting the water to an oxygenation through a free fall in the air or to an aeration by air diffusing have hitherto proved not to be properly applicable for the purpose of removing the content of methane in water to an extent being sufficient to secure that any residual content of methane should not interfere with the oxygenation process in the water and cause disturbance in the operation of the filters of the water works and prevent the water works from delivering sufficiently aired water to the users.

These drawbacks will appear in the way that the bacterium methanomonas will decompose the methane according to the equation $$CH_4 + 2O_2 = CO_2 + 2H_2O$$

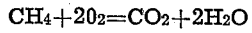

and use the thus released energy for its living. As the decomposition of 1 mg. methane demands 4 mg. oxygen, it would be evident that a relatively small content of methane will cause a considerable loss of oxygen in the water. This loss of oxygen has in several water works been of such a magnitude that the water was entirely free from oxygen which has caused nuisances, such for instance that the anaërobe bacteria of the ground water and its various kinds of mucus continue to live in such oxygen free water.

The growth of bacteria in the purifying plants causes that there will be a considerable stratification of bacteria mucus which it is difficult to wash away and which in the case of an anaërobe condition will putrefy and give the water a bad smell.

The purpose of the present invention is to avoid the said drawback and the invention is based upon the observation that it is possible to remove methane from water to the desired extent, if the water prior to the introduction of the water into the filters of the water works in question is subjected to an aeration which is extended over a considerable longer period of time than in any hitherto known process of aeration of water adapted to be used as drinking water or for similar purposes.

According to the invention air in a finely divided state is passed into the water for a period of time being not less than ten minutes which means that any part of the water is subjected to the influence of air for at least ten minutes irrespective of the water being flowing or at rest during the operation. The amount of air passed into or through the water should preferably not be less than 20 per cent of the volume of the amount of water. In this way the appearaance of an anaërobe condition in filters for a subsequent aeration of the water, due to the original presence of methane in the crude water, is avoided.

This has not been possible by the hitherto known processes for the aeration of water in water works, mainly because the removal of methane requires a considerably more lengthy treatment of the water with air than the known airing methods by which the water is generally only aired for a few seconds, and often for a fraction of a second.

As an example water containing 2 ml. methane per liter of water is continuously aired for 20 minutes in order to remove the methane contents or reduce it to a harmless minimum. If the water is saturated with methane, i. e. contains about 50 ml. methane per liter of water, the aeration process is to be continued for a considerably longer time say for an hour. The volume of air being necessary for securing the desired effect is considerably greater than by the generally known processes for removing gas from water and often represents 1.5 or 2 times the volume of water in question.

By adjusting the quantity of air and the time of aeration any reduction of the methane quantity may be obtained. Experience shows that the lower limit for the product of the time of treatment—measured in minutes—and the quantity of air—measured in percentage of volume of the amount of water treated—can be fixed at 200, as it does not seem possible to effect the removal of methane in crude water being detrimental to the quality of the water and its subsequent treatment in water filters unless the aeration is continued for a period of time being not less than about 10 minutes irrespective of how small the detrimental methane contents is, while the smallest amount of air to be used for the said purpose should not be less than about 20 per cent of the quantity of water.

The aeration may e. g. take place while the water is passing through an open or closed chute or channel or reservoir, being arranged at a proper place in the plant of the water works in question. Preferably the air is blown into the water through a system of perforated tubes, perforated plates or the like means arranged at or in the bottom of the said chute, channel or reservoir.

If desired the air may according to the invention be introduced into the crude water in the shape of an emulsion of atmospheric air in water in which way an effective distribution of the air in the water is obtained, and as a result thereof a very great surface of contact between the air and the crude water is secured. When the emulsion is broken the air will by making its way up through the crude water mechanically remove the methane from the same.

The air ventilation of methane containing water according to the invention may also be applied to water which prior to or subsequent to the air ventilation has been or will be subjected to oxygenation or ozonising processes in known manner.

Having now particularly described and ascertained the nature of my invention and in what manner the same is to be performed I declare that what I claim is:

1. In a water purification process the step which comprises passing at least 20% by volume of atmospheric air through a moving stream of public supply water having a relatively high methane content, said air being finely distributed adjacent the bottom of said stream, and said passing of air continuing for a period of time, not less than 10 minutes, sufficiently long to reduce the methane content of said public supply water to a value low enough to substantially eliminate subsequent bacterial interaction with said methane.

2. In a water purification process the step which comprises blowing atmospheric air continuously in a finely divided state from below into and through a moving stream of public water having a relatively high methane content, in a quantity of not less than 20% by volume of the amount of water at any moment subjected to the influence of the said air, and for a period of time, not less than 10 minutes, sufficiently long to reduce the methane content of said public supply water to a value low enough to substantially eliminate subsequent bacterial interaction with said methane.

3. A process as in claim 1 and in which the air is introduced into the water in the state of an air-in-water emulsion.

CARL HOLGER VISBY PAPE.

REFERENCES CITED

The following references are of record in the file of this patent:

UNITED STATES PATENTS

| Number | Name | Date |
|---|---|---|
| 1,681,890 | Washburn | Aug. 21, 1928 |
| 1,725,925 | Kent | Aug. 27, 1929 |
| 1,727,601 | Imhoff | Sept. 10, 1929 |
| 1,916,922 | Dow | July 4, 1933 |